United States Patent [19]

Jensen et al.

[11] 3,900,872

[45] Aug. 19, 1975

[54] RADAR DATA CONVERTER AND DISPLAY SYSTEM

[75] Inventors: Garold K. Jensen, Alexandria, Va.; James E. McGeogh, Silver Spring, Md.

[73] Assignee: The United States of America as represented by the Secretary of the Navy, Washington, D.C.

[22] Filed: June 27, 1967

[21] Appl. No.: 649,794

[52] U.S. Cl. .................................................. 343/9
[51] Int. Cl.² ........................................... G01S 9/44
[58] Field of Search ............................... 343/7.7, 9

[56] References Cited
UNITED STATES PATENTS

| | | | |
|---|---|---|---|
| 3,369,232 | 2/1968 | Boucher | 343/9 |
| 3,372,390 | 3/1968 | Maugue | 343/9 |
| 3,728,725 | 4/1973 | Bauer | 343/9 |

*Primary Examiner*—T. H. Tubbesing
*Attorney, Agent, or Firm*—R. S. Sciascia; Arthur L. Branning

[57] ABSTRACT

A storage type phase-coherent pulse-doppler radar system wherein return signals containing doppler information from a plurality of ranges are stored and then analyzed to determine the velocity and acceleration of targets. The resulting velocity, acceleration, range and time data are stored in a plurality of two-dimensional capacitor matrices with each of the four parameters being stored as a function of each of the other three parameters. Neon lamps associated with each of the storage capacitors and arranged in a rectangular arrays indicate the information stored in the matrices.

11 Claims, 7 Drawing Figures

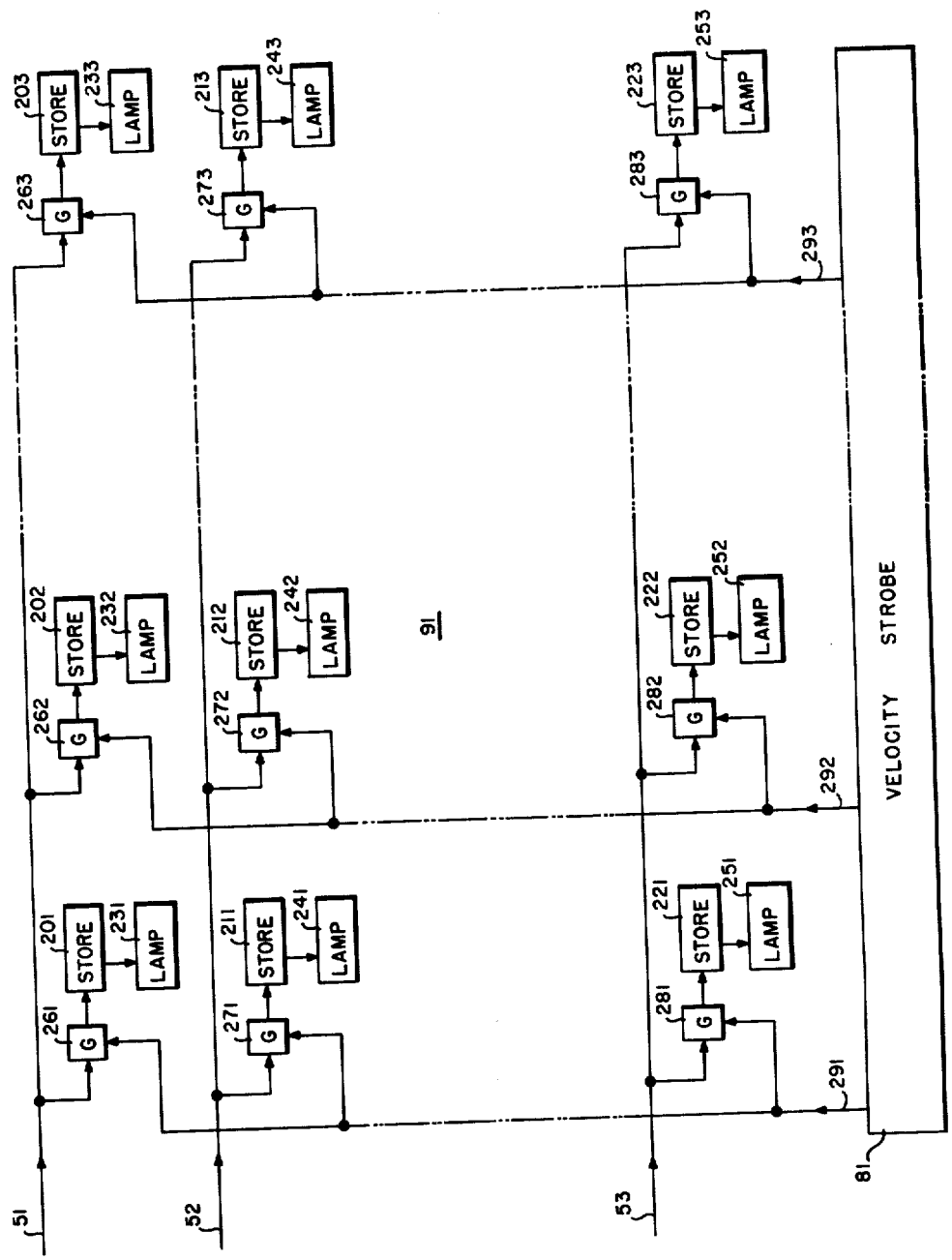

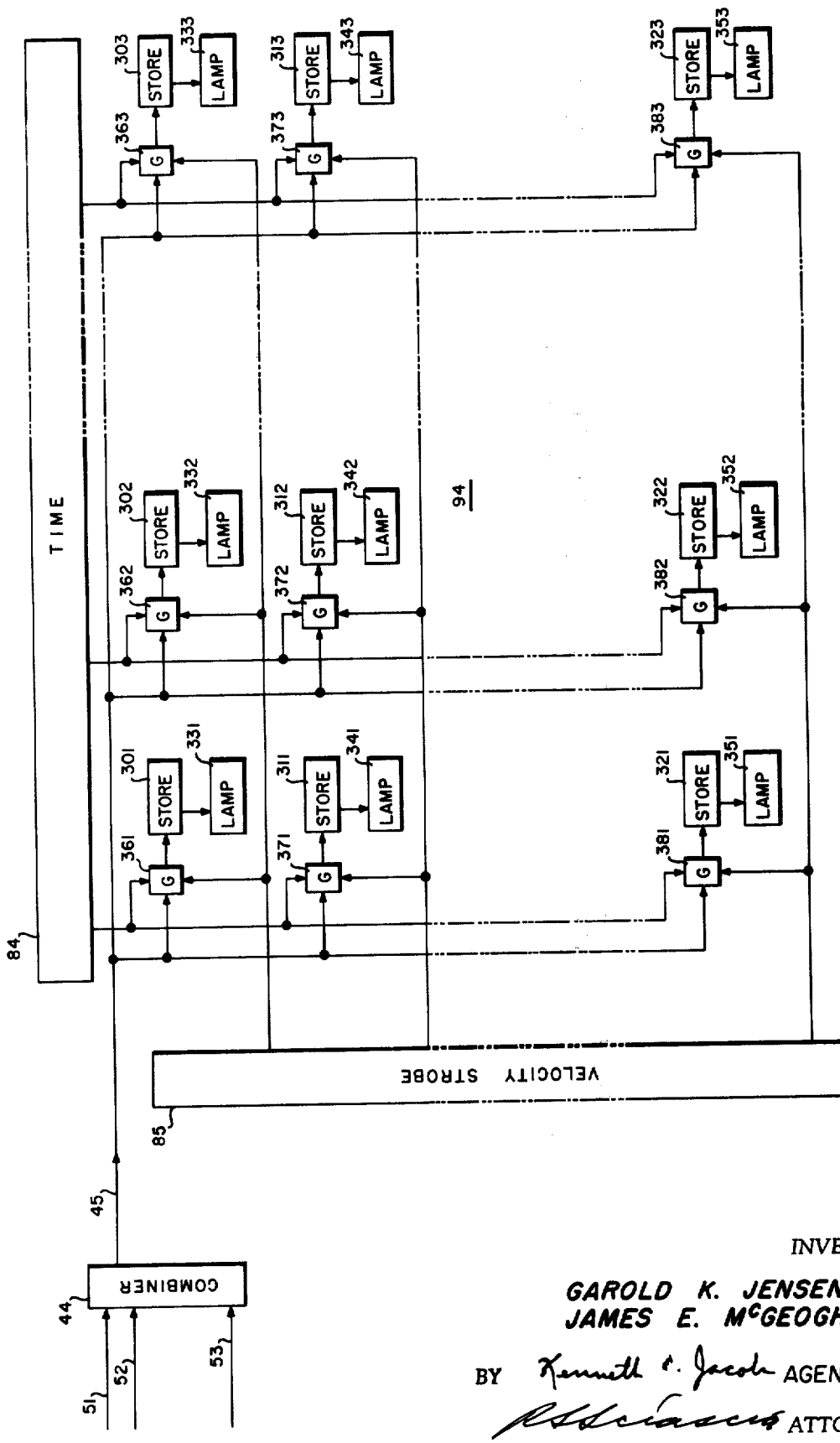

RADAR DATA CONVERTER AND DISPLAY SYSTEM

The invention described herein may be manufactured and used by or for the Government of the United States of America for governmental purposes without the payment of any royalties thereon or therefor.

BACKGROUND OF THE INVENTION

The present invention relates to a phase-coherent pulse-doppler radar system and more particularly to a system in which the analyzed return information is converted into a plurality of two-dimensional functions which are displayed in a plurality of arrays of neon indicators.

Copending application Ser. No. 649,792 filed concurrently herewith by Garold K. Jensen discloses a radar system wherein a plurality of returned echoes resulting from a plurality of transmitted pulses are stored and then analyzed to determine the doppler frequencies and rates of change of these doppler frequencies resulting from radially moving and/or accelerating targets. The system of that application displays the data on a plurality of cathode ray screens and requires a plurality of readout strobing circuits to sequentially extract the information from the storage matrices. It also requires sweep control circuits to simultaneously control the sweeps of the cathode ray tubes so that the stored information is made available for visual observation.

In order to quickly coordinate the data concerning a given target on a plurality of two-dimensional displays it is desirable to maintain the vertical and horizontal scales on the displays uniform and in alignment. This is a difficult task when working with a plurality of cathode ray tubes where sweep amplitudes and linearity may vary from tube to tube.

To maintain a non-flickering image on the cathode ray tube screens it is necessary to repeatedly read out the information from the storage matrices and constantly rewrite it on the screens.

SUMMARY OF THE INVENTION

The present application discloses a data converter and display system which converts the target range, velocity, acceleration and time of occurrence data into a plurality of two-dimensional functions (i.e., range vs. velocity, range vs. acceleration, range vs. time, velocity vs. acceleration, velocity vs. time, and acceleration vs. time) and stores these functions in capacitor storage matrices with each capacitor connected to a neon lamp so that the stored information is directly readable without the need of cathode ray tubes or readout strobing circuits.

The converter and display system according to the present invention eliminates the cathode ray tube displays and all the associated sweep and video amplifiers, sweep generators, synchronizing circuits and high voltage supplies. The resulting converter and display system can be built with each storage matrix incorporating neon indicators so that the entire assembly may comprise a flat panel which saves a great amount of equipment space. Continuous and repeated readout of the storage matrices to avoid CRT flicker is no longer necessary. Synchronization and alignment problems among a plurality of cathode ray tubes is avoided. The horizontal and vertical scales on the two-dimensional displays may be easily aligned so that all the data about a target may be quickly perceived by an observer.

The general purpose of this invention is to provide a radar data converter and display system which embraces all the advantages of prior art systems and possesses none of the aforedescribed disadvantages.

An object of the present invention is the provision of a radar system in which data on a plurality of target parameters is converted into a plurality of two parameter functions with each function stored and displayed in a combination storage and display matrix.

Another object is to provide a radar system in which a plurality of two-dimensional displays are easily maintained in alignment in respect to scale and linearity.

A further object of the invention is the provision of a compact radar storage and display system wherein the information is stored on arrays of capacitors and continuously displayed on arrays of lamps connected individually to the capacitors.

Still another object is to provide a radar system in which two-dimensional arrays of neon lamps display target range, velocity, acceleration and time as two-dimensional functions of each other.

BRIEF DESCRIPTION OF THE DRAWING

Other objects and many of the attendant advantages of this invention will be readily appreciated as the same becomes better understood by reference to the following detailed description when considered in connection with the accompanying drawings in which like reference numerals designate like parts throughout the figures thereon and wherein:

FIG. 2 shows a matrix for storing and displaying target range vs. radial velocity (i.e., range rate) data;

FIG. 3 shows a matrix for storing and displaying target velocity vs. time;

DESCRIPTION OF THE PREFERRED EMBODIMENTS

Figure 1A:
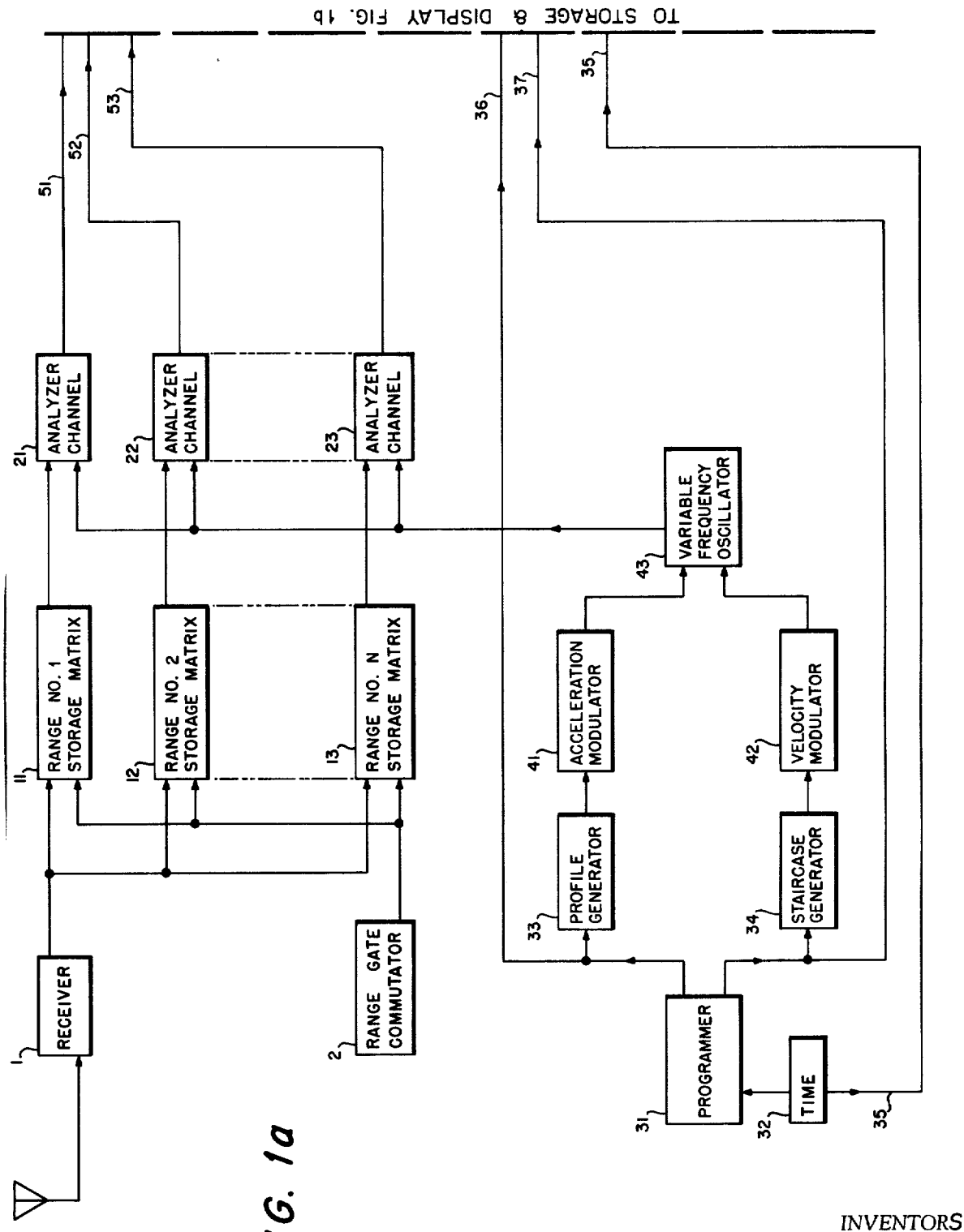
FIGS. 1 *a* and 1 *b* combined together show a block diagram of a radar system embodying the present invention.
Figure 1B:
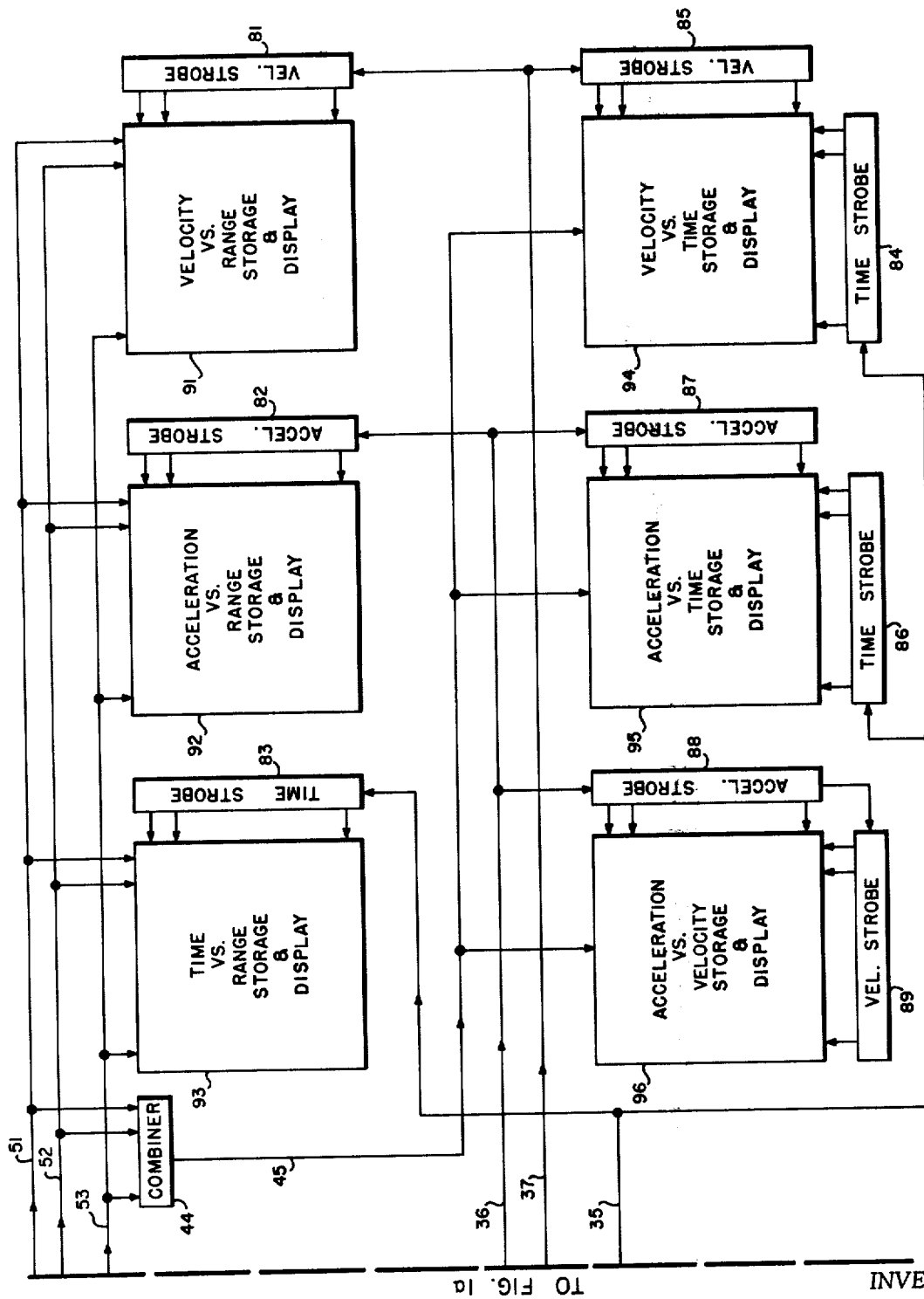

FIGS. 1 *a* and 1 *b* show a block diagram of a radar system incorporating the present invention. Receiver 1 is arranged to receive the successive echo signals resulting from a plurality of transmitted radar pulses. These echo signals may contain doppler information introduced by the presence of moving targets, and it is this doppler information which is converted into useful target data and displayed according to the present invention. As explained in detail in copending application Ser. No. 649,791 of Garold K. Jensen filed concurrently herewith, the returned signal from each transmitted pulse is mixed with one or more coherent local frequencies to produce a beat frequency corresponding to the doppler shift introduced by a moving target. Since the transmitted radar pulses are relatively short when compared with a cycle of doppler frequency, it is necessary to mix the local frequency with a succession of returned signals and maintain the local frequency coherent in phase with respect to the originally transmitted frequency. The output of the mixing process is filtered to obtain a series of bipolar video pulses whose amplitude envelope contains the doppler information. This bipolar video signal is sampled at a plurality of intervals corresponding to range gates and distributed by range gate commutator 2 to the appropriate range gate storage matrices 11, 12, 13 etc. (Only three range storage matrices are illustrated but it is obvious that more matrices would be included if desired.) Each of these storage matrices may be a plurality of capacitors which are successively gated so that a given storage matrix will store a plurality of sequential video signals corresponding to a given range gate. When these capacitors are then read out in rapid succession, the amplitude envelope of the resulting signals will contain the doppler frequency multiplied by the ratio of the write-in time over the readout time. This multiplied doppler frequency will be constant if the target is moving at a constant radial velocity, but it will vary if the radial velocity is not constant.

In order to analyze the doppler frequencies stored in the various range gate storage units 11, 12, 13, etc., a plurality of analyzer channels 21, 22, 23, etc. are used. These analyzer channels are more fully described in the copending application Ser. No. 650,157 filed concurrently herewith by Garold K. Jensen. Each analyzer channel contains a mixer in which the multiplied doppler signal read out of the corresponding range gate storage unit is heterodyned with a signal produced by variable frequency oscillator 43. This oscillator is controlled by velocity modulator 42 and acceleration modulator 41 so that it systematically produces a sequence of constant and continuously variable frequencies which correspond to expected multiplied doppler frequencies caused by the moving targets being detected. Staircase generator 34 and velocity modulator 42 cause the frequency of oscillator 43 to step through a sequence of constant frequencies which are then mixed with the unknown doppler signals. This mixing occurs in analyzing channels 21, 22, 23, etc. and each of these channels contains a band pass filter which passes a signal only when the difference frequency lies within the pass band of the filter.

Programmer 31 is arranged to emit trigger pulses to start the sweep of profile generator 33 and to cause the stepping of staircase generator 34. If the target's acceleration pattern is expected to be substantially linear over the frequency matching period, the profile generator may be a sawtooth generator, but non-linear acceleration profiles may be included if necessary.

Figure 6:
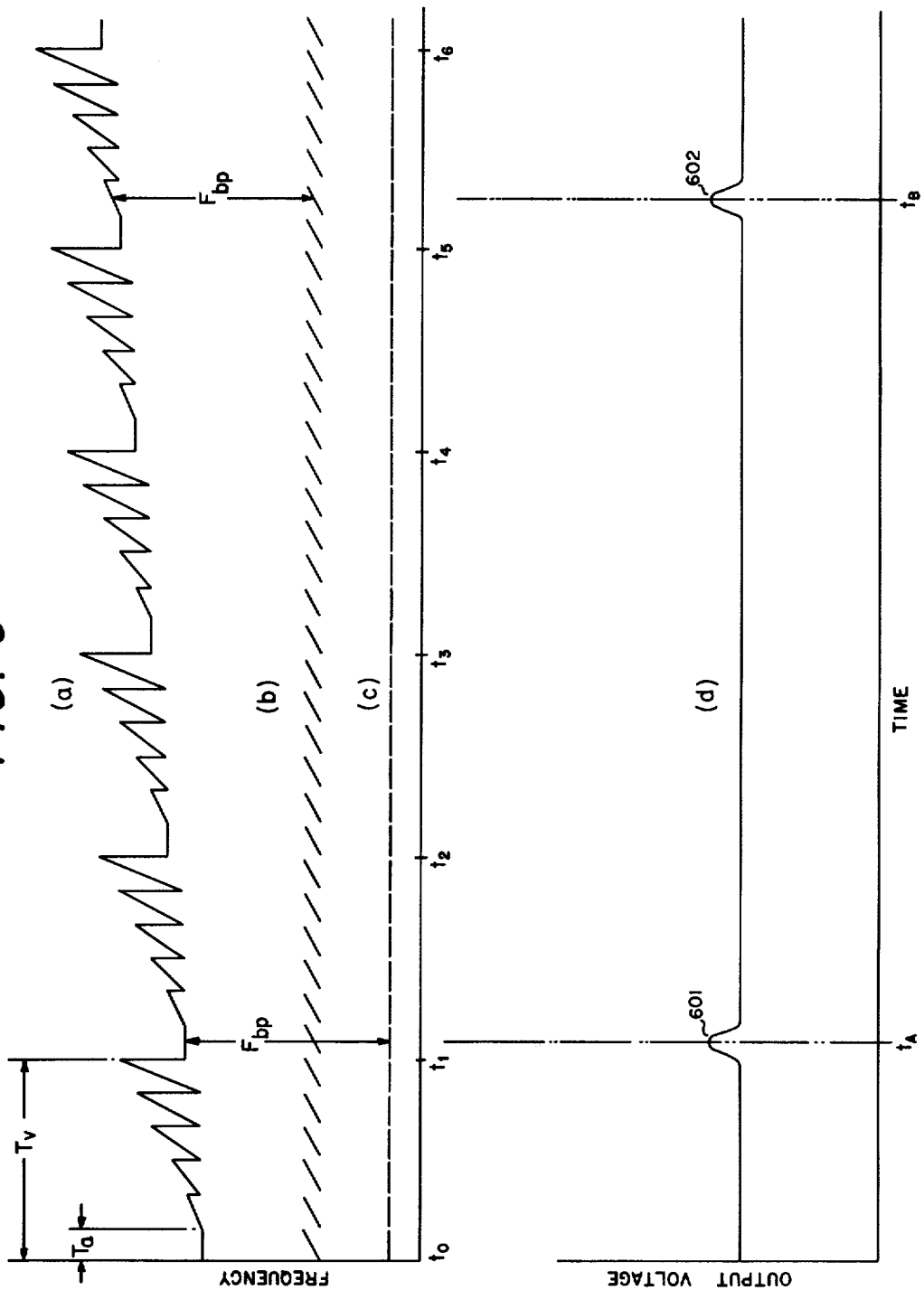
FIG. 6 shows a time diagram of signals present in the system.

The frequency analyzing operation can be better understood with reference to FIG. 6 where signal ($a$) shows the frequency of the signal being emitted by variable frequency oscillator 43 and signals ($b$) and ($c$) represent the multiplied doppler frequency signals present in the output of one of the range gate storage units such as storage matrix 11 in FIG. 1($a$). Signals ($b$) and ($c$) could result from two targets having the same range but different velocities and accelerations. As shown, signal ($c$) would represent a constant velocity target while signal ($b$) would respresent a higher velocity target having a constant radial acceleration. To simplify the explanation only six velocity gates and six acceleration gates are illustrated in FIG. 6 and only increasing frequency profiles are shown. If both accelerating and decelerating targets were expected, decreasing frequency sweeps would be included. Likewise non-linear sweep patterns could be included. The period $T_a$ in FIG. 6 is the time for one complete memory readout and during each $T_a$ seconds the stored signal is compared in frequency with a different local frequency to determine if the difference frequency will pass through the narrow band pass filter in the analyzer channel. Thus, in the time between $t_0$ and $t_1$ in FIG. 6 the range gate storage matrix is read out six times and six sequential frequency comparisons are made. First the target signal is compared with a constant frequency signal and then it is successively compared with linearly increasing frequencies whose rates of change are stepwise increased. At time $t_1$ the inspection of the first velocity gate has been completed and the inspection of the next higher velocity gate is about to begin. This inspection is accomplished in the same manner as before except all the locally generated frequencies are now shifted upward by a constant amount.

Target signals ($b$) and ($c$) are obtained by repeatedly reading out the contents of one range gate memory matrix and it can be seen that they differ from signal ($a$) by a certain frequency $F_{bp}$ at certain times during the comparison sequence. If it is assumed that $F_{bp}$ is the frequency which passes through the narrow band pass filter while other frequencies are rejected by this filter, the output signal from the analyzer channel will be as shown in FIG. 6 $d$. The time positions of the two output pulses 601, 602 indicate in which velocity gates and in which acceleration gates the two targets occur.

Output signals such as shown in FIG. 6($d$) appear on lines 51, 52, 53, etc. in FIG. 1 $a$ and these signals in conjunction with time signals on line 35 contain all the information necessary for the formation of two-dimensional plots of range vs. time, velocity vs. range, acceleration vs. time, acceleration vs. range, velocity vs. time, and acceleration vs. velocity.

The velocity vs. range plot is obtained by supplying the analyzer channel outputs in parallel over lines 51, 52, 53, etc. to velocity vs. range storage and display matrix 91 and using velocity write-in strobe 81 to sequentially gate the columns of storage elements in matrix 91.

A more complete understanding of this storage and display operation can be obtained by referring to FIG. 2 which shows a more detailed diagram of matrix 91 and its associated strobe circuit 81. Signals such as that shown in FIG. 6 ($d$) appear on lines 51, 52, 53, etc. which carry signals from the respective range intervals. For example, FIG. 6 ($d$) may represent a signal on line 51 which means that target signals 601 and 602 represent targets found in range gate No. 1.

The signals from the various range gates are applied in parallel on lines 51, 52, etc. to the corresponding rows of storage matrix 91, and gating signals from velocity write-in strobe 81, control gates 261, 262, 271, etc. to distribute these signals to the proper matrix columns. Strobe circuit 81 may include a ring counter which receives the velocity step trigger pulses from programmer 31 and energizes lines 291, 292, etc. in sequence in unison with the stepping of staircase generator 34. These lines control gates 261, 262, 271, etc. so that these gates pass the signals on lines 51, 52, etc. to the appropriate storage devices 201, 202, 211, etc.

Figure 4:
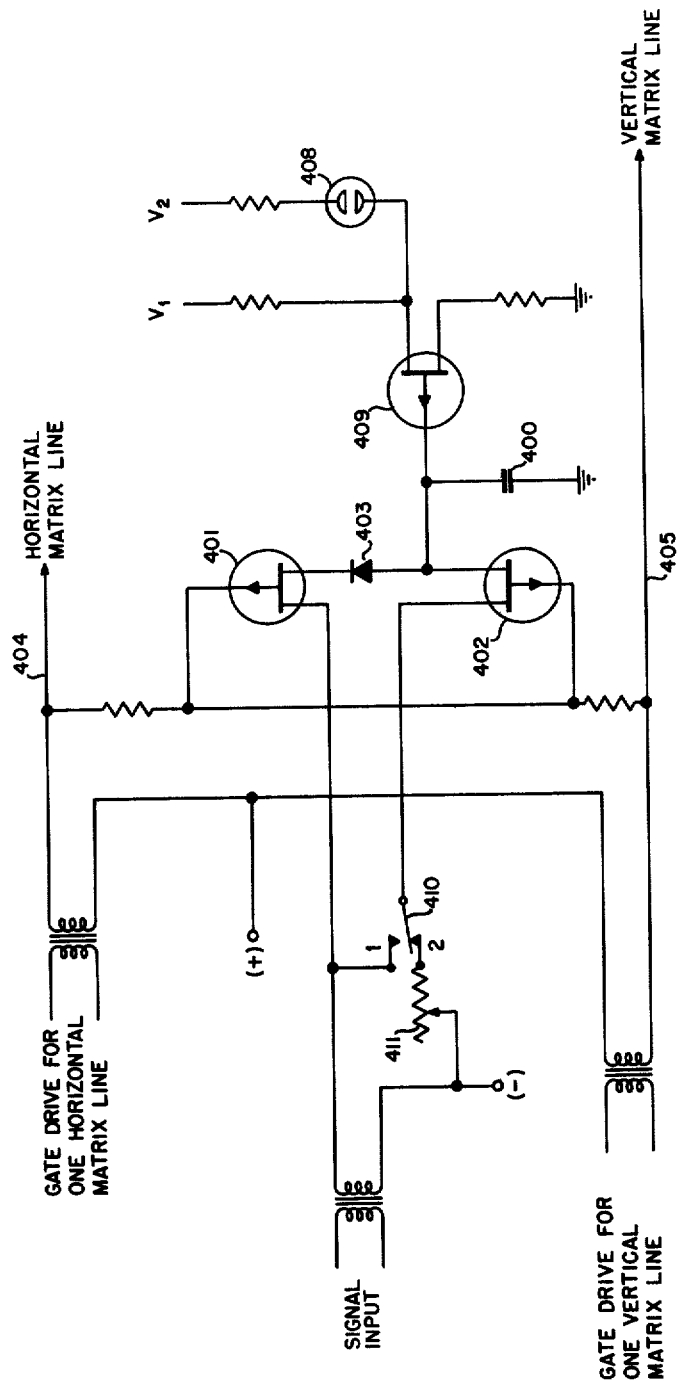
FIG. 4 shows a typical storage and display circuit for use in a matrix with means to vary the retention time of the storage element.

A typical storage device is shown in FIG. 4 where capacitor 400 is the element used to store an information signal. FIG. 4 shows a circuit wherein gating signals must appear simultaneously on lines 404 and 405 before transistor gate 401 will function to pass the signal input to capacitor 400. In the velocity vs. range matrix of FIG. 2 only one gating input for each storage device is needed and the horizontal write-in matrix line 404 is not used. The circuit shown in FIG. 4 could be used as gate 261, store 201, and lamp 231 in FIG. 2. The information signal input such as that shown in FIG. 6 (d) would appear on line 51 and the gating signal would occur at appropriate times on line 291. Store 201 is arranged to store target signals which occur in the first range gate and the first velocity gate. More than one target may appear at this range and velocity but this fact would not be indicated in store 201 (i.e., in capacitor 400 of FIG. 4), because the storage element is charged to the largest amplitude presented to it during a gating period and multiple targets signals do not add to this largest amplitude. FIG. 4 shows how this storage is brought about. Transistor gate 401 has the capability of charging storage element 400 to the highest input signal level as long as gating signals are present but, due to the presence of diode 403, it cannot reduce the charge to the lower level of a subsequent input signal. With switch 410 in position 2 controlled erasing with a variable retention time is obtained. The retention time (up to several minutes) may be controlled by variable resistor 411. With the switch in position 1 transistor 402 permits the charge on capacitor 400 to be reduced to lower levels in situations where it is not necessary to select the largest signal for storage. Such a situation occurs in acceleration vs. velocity matrix 96.

In order to store the signal of FIG. 6 (d) in the velocity vs. range matrix of FIG. 2, this signal is supplied on line 51, and gate 261 is opened during the time from $t_0$ to $t_1$, then gate 262 is opened from $t_1$ to $t_2$ and the remaining gates in the row are likewise opened in turn. As shown, target signal 601 would be stored in the second storage device (i.e., store 202) in the first row of matrix 91 and signal 602 would be stored in the sixth storage device in the same row.

Figure 5:
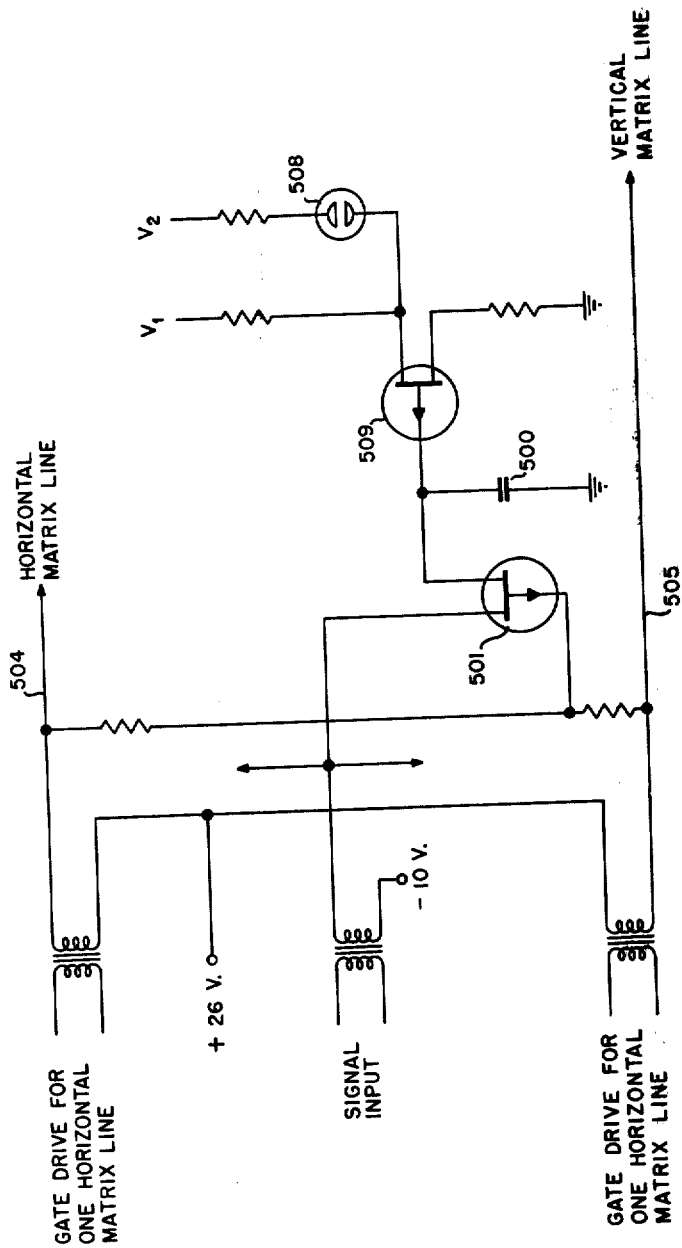
FIG. 5 shows another typical storage and display circuit for use in a matrix.

FIG. 5 shows a storage device without an arrangement for retaining the highest signal received during a gating period. The charge on capacitor 500 will follow the applied signal up or down as lone as transistor gate 501 is passing the signal. Such a storage element could be used in acceleration vs. velocity matrix 96.

FIG. 3 shows matrix 94 for storing and displaying information concerning the velocity and time of occurrence of the targets. In this matrix range information is not being used so all of the signals from the parallel range channels on lines 51, 52, 53 etc. are combined into a single sequence of signals to be supplied to matrix 94. The combining operation is carried out by combiner 44 which linearly adds the signals on lines 51, 52, 53, etc. and transmits the combined signals on line 45. Only signals above a selected threshold on the input lines are added. After this addition the signals on line 45 represent all targets regardless of range and these signals are presented simultaneously to all the storage devices 301, 302, 311, 312, etc. These storage devices may be similar to that shown in FIG. 4 and both horizontal and vertical gating signals are needed to permit the signal to be stored. The write-in gating signals are supplied by strobe circuits 84 and 85 which may include ring counter circuits under the control of time generator 32 and programmer 31.

In order to display a complete history of the target motion it is desirable to have plots of target range, velocity and acceleration versus time. Time generator 32 emits equally spaced pulses on line 35 which are synchronized with a complete analysis cycle, i.e., a cycle in which all velocity gates and all acceleration gates are inspected. Such a complete cycle of analysis is illustrated in FIG. 6 where a signal diagram for a simplified system with six velocity gates and six acceleration gates is illustrated. Time generator 32 causes time write-in strobe 84 to step once after each complete velocity and acceleration analysis cycle. For example, referring to matrix 93 in FIG. 1 b the signals from the various range gates are applied in parallel to the horizontal lines of the matrix while time generator 32 causes write-in strobe 83 to step once after each inspection of all the velocity and acceleration gates. If one of the range gates included two targets such as those represented by signals 601 and 602 in FIG. 6(d) the particular storage capacitor for that range and time interval in matrix 93 would be charged to the level of the highest signal and the matrix would merely retain the fact that at least one target was present at the given range and time. These targets would not be indicated separately on the range vs. time display.

The operations of the other matrices 92, 95 and 96 are similar to that of the matrices described above. In all cases the acceleration write-in strobes 82, 87, 88 step in unison with the sweeps of acceleration modulator 41, while the velocity write-in strobes 81, 85, 89 step with velocity modulator 42, and the time write-in strobes 83, 84, 86 step with the signals from time generator 32.

The readout of all two-dimensional matrices is brought about by assigning an indicator lamp such as lamp 231 in FIG. 2 or lamp 331 in FIG. 3 to each storage element. Each lamp is lighted whenever its corresponding storage element is charged to indicate the presence of a target. As shown in FIGS. 4 and 5 these indicators could be neon lmaps such as lamps 408 and 508. Field effect transistors, 409 and 509 are included between the lamp and the storage capacitor to control the lamp voltage without draining the charge from the storage capacitor.

The capacitors and their accompanying indicators may be placed in flat, rectangular panels with the spacings between the lamps maintained at uniform amounts. In this way when several of the panels are placed side by side it is possible for the observer to easily and quickly interpret the signals. Thus, with the range vs. velocity, range vs. acceleration, and range vs. time panels placed side by side with all the signals from a given range aligned in a single row it is possible to quickly perceive the motion parameters of the target or targets.

In conclusion, therefore, there has been disclosed a system for converting moving target radar data for display on several two-dimensional arrays of lamps so that multiple targets can be distinguished due to differences in one or more aspects of the targets' movements.

Various modifications are contemplated and may obviously be resorted to by those skilled in the art without department from the spirit and scops of the invention, as hereinafter defined by the appended claims as only a preferred embodiment thereof has been disclosed.

What is claimed and desired to be secured by Letters Patent of the United States is:

1. A radar system comprising:
   receiver means for receiving radar echo signals and providing on a plurality of output lines doppler signals related in frequency to the movement of distant objects with each one of said output lines carrying doppler signals derived from a different one of a plurality of predetermined range intervals;
   oscillator means whose output is stepped repetitively through a sequence of different constant frequencies and varying frequencies which vary at different rates;
   analyzer means connected to said plurality of output lines and to said oscillator means to produce on a plurality of analyzer output lines analyzer signals whenever said doppler signals differ in frequency from the frequency of said oscillator signals by predetermined amounts with each of said analyzer output lines carrying analyzer signals derived from a different one of said plurality of predetermined range intervals;
   a two-dimensional storage matrix comprising a plurality of storage elements connected to store the signals appearing on said analyzer output lines;
   strobing means connected to said storage matrix to sequentially gate open said storage elements in unison with the stepping of said oscillator output; and
   a two-dimensional array of display devices associated with said storage matrix with each of said display devices connected to a different one of said plurality of storage elements to indicate when a signal is stored in said storage element.

2. The system of claim 1 wherein each of said display devices is a device which is activated whenever its corresponding stored signal exceeds a threshold value.

3. The system of claim 1 wherein each of said display devices is a lamp.

4. The system of claim 1 wherein each of said display devices is a neon lamp.

5. The system of claim 1 wherein each said storage element is connected to a corresponding display device by an isolating amplifier.

6. The system of claim 1 including:
   a time generator which supplies a time signal to said strobing means each time said oscillator means is stepped through its said sequence of frequencies.

7. The system of claim 1 including:
   a plurality of two-dimensional arrays of display devices with each array displaying one target parameter as a function of another target parameter.

8. The system of claim 1 wherein said storage elements are storage capacitors.

9. A radar system comprising:
   receiver means for receiving radar echo signals and providing on a plurality of output lines doppler signals related in frequency to the movement of distant objects with each one of said output lines carrying doppler signals derived from a different one of said plurality of predetermined range intervals;
   oscillator means whose output is stepped repetitively through a sequence of different constant frequencies and varying frequencies;
   analyzer means connected to said plurality of output lines and to said oscillator means to produce on a plurality of analyzer output lines analyzer signals whenever said doppler signals differ in frequency from the frequency of said oscillator signals by predetermined amounts with each of said analyzer output lines carrying analyzer signals derived from a different one of said plurality of predetermined range intervals;
   a time generator for producing a time signal each time said oscillator repeats its sequence of frequencies;
   a plurality of two-dimensional storage matrices each comprising a plurality of storage elements to store the signals appearing on said analyzer output lines;
   programming means for supplying regularly spaced signals to control the stepping of said oscillator and to sequentially gate open certain of said storage elements;
   means connecting said time generator to certain of said storage matrices to sequentially gate open certain of said storage elements; and
   a plurality of display devices, each individually connected to a respective one of said storage elements, to indicate when signals are stored in said storage element.

10. The system of claim 9 wherein said storage elements are capacitors.

11. The system of claim 9 wherein said display devices are lamps.

* * * * *